United States Patent
Le et al.

(10) Patent No.: US 10,044,589 B2
(45) Date of Patent: Aug. 7, 2018

(54) ADAPTIVE RATE CONTROL FOR CELLULAR-BASED VEHICULAR NETWORKS

(71) Applicant: NEC EUROPE LTD., Heidelberg (DE)

(72) Inventors: Long Le, Berlin (DE); Nikola Zahariev, Hannover (DE); Shiqiang Wang, London (GB)

(73) Assignee: NEC CORPORATION, Tokyo (JP)

( * ) Notice: Subject to any disclaimer, the term of this patent is extended or adjusted under 35 U.S.C. 154(b) by 175 days.

(21) Appl. No.: 14/758,591

(22) PCT Filed: Jan. 29, 2013

(86) PCT No.: PCT/EP2013/051652
§ 371 (c)(1),
(2) Date: Jun. 30, 2015

(87) PCT Pub. No.: WO2014/117810
PCT Pub. Date: Aug. 7, 2014

(65) Prior Publication Data
US 2015/0326462 A1  Nov. 12, 2015

(51) Int. Cl.
*H04L 12/26* (2006.01)
*H04L 1/00* (2006.01)
(Continued)

(52) U.S. Cl.
CPC ........ *H04L 43/0894* (2013.01); *H04L 1/0002* (2013.01); *H04L 67/12* (2013.01); *H04W 28/0231* (2013.01); *H04W 28/22* (2013.01)

(58) Field of Classification Search
CPC ... H04L 43/0894; H04L 67/12; H04L 1/0002; H04L 12/2676; H04L 47/25; H04W 4/02;
(Continued)

(56) References Cited

U.S. PATENT DOCUMENTS 6,931,029 B1 * 8/2005 Pothier ................. H04J 3/0632
370/503
6,956,819 B1 * 10/2005 Yamada ................ H04L 67/322
370/230
(Continued)

OTHER PUBLICATIONS

Brijesh Kadri Mohandas et al: "Improving data QoS in vehicular communication", Future Information Networks, 2009. ICFIN 2009. First International Conference on IEEE, Piscataway, NJ, USA, Oct. 14, 2009 (Oct. 14, 2009), pp. 161-166, XP031570346.
(Continued)

*Primary Examiner* — Hoang-Chuong Q Vu
(74) *Attorney, Agent, or Firm* — Leydig, Voit & Mayer, Ltd.

(57) ABSTRACT

A method for supporting vehicular communication in a cellular-based communication system includes connecting at least one base station and a plurality of vehicles equipped with mobile communication devices. A centralized control entity coordinates packet transmissions of the vehicles. Adjustment of a packet transmission rate is done recursively, where parameters of packet transmission characteristics are measured and the control entity determines, based on the parameters of packet transmission characteristics, an optimal packet transmission rate. The vehicles and/or the control entity transmit packets use the optimal packet transmission rate.

20 Claims, 4 Drawing Sheets

(51) Int. Cl.
*H04L 29/08* (2006.01)
*H04W 28/02* (2009.01)
*H04W 28/22* (2009.01)

(58) Field of Classification Search
CPC .. H04W 52/26; H04W 28/22; H04W 28/0231
See application file for complete search history.

(56) References Cited

U.S. PATENT DOCUMENTS

| | | |
|---|---|---|
| 9,439,100 B2* | 9/2016 | Bajpai ............... H04W 28/0236 |
| 2004/0190452 A1* | 9/2004 | Imiya ................. H04L 12/2602 |
| | | 370/232 |
| 2006/0039346 A1* | 2/2006 | Shapiro .................. H04L 47/10 |
| | | 370/349 |
| 2006/0209872 A1* | 9/2006 | Matsui ................ H04M 1/2535 |
| | | 370/437 |
| 2007/0013519 A1* | 1/2007 | Chung .................. G06Q 10/08 |
| | | 340/572.1 |
| 2008/0267175 A1* | 10/2008 | Mo ........................ H04L 45/02 |
| | | 370/357 |
| 2009/0016238 A1* | 1/2009 | Yu ....................... H04L 41/0896 |
| | | 370/253 |
| 2010/0121977 A1* | 5/2010 | Kontola ................ H04L 1/0002 |
| | | 709/232 |

OTHER PUBLICATIONS

Pravin Shankar et al: "CARS: Context-Aware Rate Selection for vehicular networks", Network Protocols, 2008. ICNP 2008. IEEE International Conference on, IEEE, Piscataway, NJ, USA, Oct. 19, 2008 (Oct. 19, 2008), pp. 1-12, XP031368945.

Ching-Ling Huang et al: "Intervehicle Transmission Rate Control for Cooperative Active Safety System", IEEE Transactions on Intelligent Transportation Systems, IEEE, Piscataway, NJ, USA, vol. 12, No. 3, Sep. 1, 2011 (Sep. 1, 2011), pp. 645-658, XP011382596.

ETSI TS 136 211 V10.4.0 (Jan. 2012) LTE; Evolved Universal Terrestrial Radio Access (E-UTRA); Physical channels and modulation (3GPP TS 36.211 version 10.4.0 Release 10), pp. 1-102.

* cited by examiner

| Vehicle ID |
|---|
| Timestamp |
| Sequence number |
| Cell ID |
| Geographical position |
| Speed and heading |
| Current packet transmission rate at vehicle |
| Delay of packets from control entity |
| Packet rate at which the control entity was sending when measuring the delay |
| Additional control and security info |
| Other message content |

Fig. 6

| Vehicle ID |
|---|
| Timestamp |
| Sequence number |
| New packet rate for vehicle |
| Current packet transmission rate at control entity |
| Additional control and security information |
| Other message content |

Fig. 7

ADAPTIVE RATE CONTROL FOR CELLULAR-BASED VEHICULAR NETWORKS

CROSS-REFERENCE TO PRIOR APPLICATIONS

This application is a U.S. National Phase application under 35 U.S.C. § 371 of International Application No. PCT/EP2013/051652, filed on Jan. 29, 2013. The International Application was published in English on Aug. 7, 2014 as WO 2014/117810 under PCT Article 21(2).

FIELD

The present invention relates to a method for supporting vehicular communication in a cellular-based communication system, preferably in a 3G/UMTS or 4G/LTE network, comprising providing at least one base station and a plurality of vehicles being equipped with mobile communication devices, and coordinating packet transmissions of said vehicles by means of a centralized control entity.

BACKGROUND

Vehicular networking and communication is considered as a key technology in the roadmap of the future Intelligent Transport Systems (ITS) because it promises to improve road safety and traffic efficiency. It allows vehicles to exchange information among each other to support various applications such as collision avoidance or cooperative adaptive cruise control (cooperative ACC). Further, using vehicular networking, vehicles can also communicate with roadside infrastructure systems to attain useful information such as roadwork warning, weather warning, or information about available parking in a city.

Currently, vehicular communication is premised on the concept that vehicles and road infrastructure form a vehicular ad hoc network (VANET) in a spontaneous manner to exchange information with each other over the wireless medium. Major effort has been invested in developing ad hoc vehicular communication using short-range communication technologies such as IEEE 802.11 (WLAN). However, a major deployment problem that vehicular communication is currently facing is that it is a cooperative technology, i.e., its effects can be best realized when a certain percentage of vehicles are equipped with this technology. Thus, while there is a great momentum behind the technological development for vehicular communication, the deployment for this system appears rather slow (or stagnant).

An effective bootstrapping strategy for the deployment of vehicular communication could be to rely on the next generation of mobile communication. With the advent of smart phones and the deployment of 4G/LTE mobile communication, the development of mobile high-speed Internet is gaining great momentum and can be helpful for the deployment of vehicular communication. Vehicle manufacturers can equip their vehicles with a smart phone that offers a wide range of applications without relying on the cooperative nature of vehicular communication. On the other hand, smart phones equipped in the vehicles can also be used as a communication device that allows vehicles to exchange messages with each other and/or communicate with the transportation infrastructure.

An important aspect of cellular-based vehicular networking is that there is no direct communication link between a sender and a receiver at the lower layer (e.g., layer 2) such as in the case of WLAN-based vehicular networking. Rather, vehicles have to rely on one or multiple network elements at higher layer (e.g., layer 3 or higher) to relay data. A design approach for cellular-based networking is to introduce a new network element that serves as a message reflector to facilitate the communication among vehicles. This network element functions as a server for the vehicles and road infrastructure, i.e., it processes incoming messages from its clients (vehicles and road infrastructure) and redistributes these messages to them. Since this server is typically responsible for a geographical area, it is termed GeoServer. The main functionality of a GeoServer is to provide vehicles with geographical-related services such as safety- and commercial-related services.

An important application message in vehicular communication is the application-layer beacon message, also called heartbeat, basic safety message, or cooperative awareness message (CAM). This message is periodically broadcast by each vehicle and contains the vehicle's status such as vehicle's position, speed, and heading. This message allows a vehicle to be aware of others in its surrounding. Using the periodic CAM messages received from others, a vehicle can detect potential collisions with other vehicles in its vicinity. The rate at which CAMs are sent needs to be carefully chosen to avoid network congestion and, at the same time, minimize the latency of message passing.

Another important application message in vehicular networking is event-triggered danger warning message (also called decentralized environmental notification message or DENM) that is transmitted by vehicles or roadside infrastructure when a critical situation is detected. Given their importance, DENMs are usually forwarded by the GeoServer to a geographical area in a deployment scenario of cellular-based vehicular networking.

Main issues in vehicular networking include the fact that radio resources are limited but applications need to transmit messages at a high rate. This may lead to congestion in the radio access network and incurs long delay for the messages. On the other hand, applications also have stringent requirement for latency (or freshness) of the received information. These two conflicting requirements pose a difficult problem for applications of vehicular networking.

SUMMARY

In an embodiment of the present invention, a method for supporting vehicular communication in a cellular-based communication system includes connecting at least one base station and a plurality of vehicles equipped with mobile communication devices. A centralized control entity coordinates packet transmissions of the vehicles. Adjustment of a packet transmission rate is done recursively, where parameters of packet transmission characteristics are measured and the control entity determines, based on the parameters of packet transmission characteristics, an optimal packet transmission rate. The vehicles and/or the control entity transmit packets using the optimal packet transmission rate.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

The present invention relates to a method for supporting vehicular communication in a cellular-based communication system, preferably in a 3G/UMTS or 4G/LTE network, comprising providing at least one base station and a plurality of vehicles being equipped with mobile communication devices, and coordinating packet transmissions of said vehicles by means of a centralized control entity.

Furthermore, the present invention relates to a cellular-based communication system with vehicular communication support, preferably deployed in a 3G/UMTS or 4G/LTE network, comprising at least one base station and a plurality of vehicles being equipped with mobile communication devices, and a centralized control entity that coordinates packet transmissions of said vehicles.

The embodiment of the present invention provides a method for supporting vehicular communication in a cellular-based communication system and a cellular-based communication system of the initially described type in such a way that the communication latency of application messages is reduced, while at the same time the problem of network congestion is mitigated as far as possible.

According to an embodiment, the method further includes adjusting a packet transmission rate, in which the following steps are recursively executed:
measuring one or more parameters related to packet transmission characteristics,
by said control entity, based on the results of the measurements, determining an optimal packet transmission rate,
wherein said vehicles and said control entity transmit packets by applying said optimal packet transmission rate.

According to a further embodiment, a cellular-based communication system includes said control entity and said vehicles that are configured to adjust a packet transmission rate by recursively executing the following steps:
measuring one or more parameters related to packet transmission characteristics,
by said control entity, based on the results of the measurements, determining an optimal packet transmission rate,
wherein said vehicles and said control entity transmit packets by applying said optimal packet transmission rate.

The embodiments of the present invention provide a solution for finding an optimal trade-off between network congestion and the freshness of received information. The embodiments of the present invention further provide a feedback-based scheme for vehicles (clients) and a centralized entity (e.g. a GeoServer) to coordinate with each other to determine a transmission rate for messages that best satisfies the application requirements. By performing measurements related to the current packet transmission characteristics and by adapting the transmission rate on the basis of respective feedback information network congestion is effectively prevented from occurring in cellular-based vehicular communication networks. Further, the present invention can take into consideration both crucial requirements for ITS applications: delay and loss rate so that application requirements for both delay and loss rate can be met to the best effort. By implementing a feedback-based scheme for a centralized coordinator and vehicles (clients) to coordinate with each other a transmission rate for messages can be determined that best satisfies the application requirements for both loss rate and delay.

The embodiments of the present invention further provide an application level rate control, which works with the UDP stack and no additional modification to the protocol stack would be necessary, which is simpler than schemes that require stack modifications.

The embodiments of the present invention can be suitably applied, though not limited thereto, to LTE networks. While current state-of-the-art solutions cannot address performance issues for ITS domain in LTE-based vehicular communication, like low delay/latency and high scalability, according to the present invention the latency for data exchange between vehicles in LTE-based vehicular communication is significantly reduced. Since latency plays an important role for traffic safety, the present invention improves the effectiveness for ITS safety applications.

According to a preferred embodiment of the present invention, the control entity calculates optimal packet transmission rates independently for uplink and downlink transmissions. In this regard it is important to note that it might be beneficial to consider different rates for the uplink and downlink data transmission due to their different bandwidth and data rate support. For this reason, also the rate adjustment procedures for the uplink and downlink might be slightly different. In any case both procedures for the uplink rate adjustment and for the downlink rate adjustment are run recursively as long as the vehicle is connected to the control entity.

According to another preferred embodiment of the present invention, the packet transmission rate adjustment procedure may be performed for each cell of the network individually. By such individual treatment of each cell (which corresponds to one base station in the cellular network), optimal packet transmission rates can be achieved in the entire network. In this regard it is important to note that the base stations of a network can have significantly different characteristics that may require different rate adjustments.

While optimal packet transmission rate calculation and adjustment/enforcement is always performed by the centralized control entity, it may be provided that the measurements are performed both by the control entity and by the vehicles. Integrating the vehicles into the measurement process significantly increases the amount of data that can be utilized by the control entity for performing rate calculation, thereby improving the effectiveness and reliability of the calculation. It may be provided that the vehicles send feedback information regarding the measurement results to the control entity, e.g. via dedicated control channels or embedded in the control header of data packets.

According to a specific embodiment of the present invention, the measurements include the measurement of the delay of packets sent by the control entity and/or by the vehicles. In order to enable the control entity to measure the delay of packets sent by vehicles and, reversely, in order to enable the vehicles to measure the delay of packets sent by the control entity, uplink and downlink packets may include a timestamp that indicates the time at which information contained in the respective packet has been generated or updated. In this regard it is to be noted that it is a common assumption in vehicular networking that vehicles are equipped with Global Positioning System (GPS) devices which can provide accurate global timing. Hence, the delay of packets can be directly measured at the receiver. However, all nodes should keep synchronized with the global time. Such precise timing obtained from GPS devices installed at vehicles taken together with the fact that the rate control mechanism is centralized allows relatively accurate rate control, without the need of much additional signaling overhead.

In a preferred embodiment of the present invention, the packet transmission rate adjustment procedure includes a coarse determination step, in which the packet transmission rate is calculated theoretically according to a predefined algorithm. In particular, it may be provided that the transmission rate is directly set to an optimal value that the control entity calculates from theoretical models based on information available at the control entity. For instance, one or more of the parameters packet delay, position and speed of the vehicles, the total number of vehicles in a particular cell, and environmental and system-specific parameters may serve as input to the algorithm. According to a specific embodiment of the present invention, the algorithm is derived from queuing models at the application level.

According to a particularly preferred embodiment of the present invention, information depreciation is introduced as a metric that measures the newness or freshness of information gathered at the vehicles and transmitted to the control entity, and vice versa. Information depreciation is a variable that identifies a kind of obsolescence or aging of data, and it may be defined as the maximum difference between the current time and the time when the information has been gathered at a vehicle (or, correspondingly, the control entity) and sent out to the controlled entity (or, correspondingly, the vehicle).

In addition to the above-mentioned coarse determination step the packet transmission rate adjustment procedure may include a fine determination step, in which the packet transmission rate is iteratively adjusted in steps of a predefined size based on the measured information depreciation. More specifically, the control entity may adapt the packet transmission rate in a way such that the performance metric, i.e. the information depreciation is minimized. To put it in other words, the goal is to minimize information depreciation, since information newness can be regarded as one of the most significant factors for vehicular networks. According to an embodiment of the present invention, the information are attempted to be kept as new as possible, as long as the network condition allows. The direct advantage of implementing this embodiment is that it will keep the information up-to-date, while concurrently avoiding network congestion. Hence, this approach is more suitable for vehicular networks than conventional distributed congestion control mechanisms, such as those used in the TCP protocol.

The combination of the coarse and fine estimation is for ensuring fast convergence, by attempting to set to the optimal value directly and by considering deviations between the theoretical model and the actual network. A switching between applying fine and coarse estimation may be performed based on the variation of network congestion condition and context information, such as the speed of vehicles etc.

The embodiments of the present invention described hereinafter in some more detail in connection with FIGS. 1-7 are mostly related to LTE (Long Term Evolution) networks. Consequently, the terminology employed hereinafter is adapted to the LTE terminology, i.e. vehicles or, more specifically, the mobile communication devices the vehicles are equipped with are briefly denoted UE (User Equipment) and a base station is referred to as eNodeB. However, as will be appreciated by those skilled in the art the application of the present invention is not limited to LTE networks. In fact, it is possible to apply the invention in any other mobile cellular networks, like for instance UMTS networks.

Figure 1:
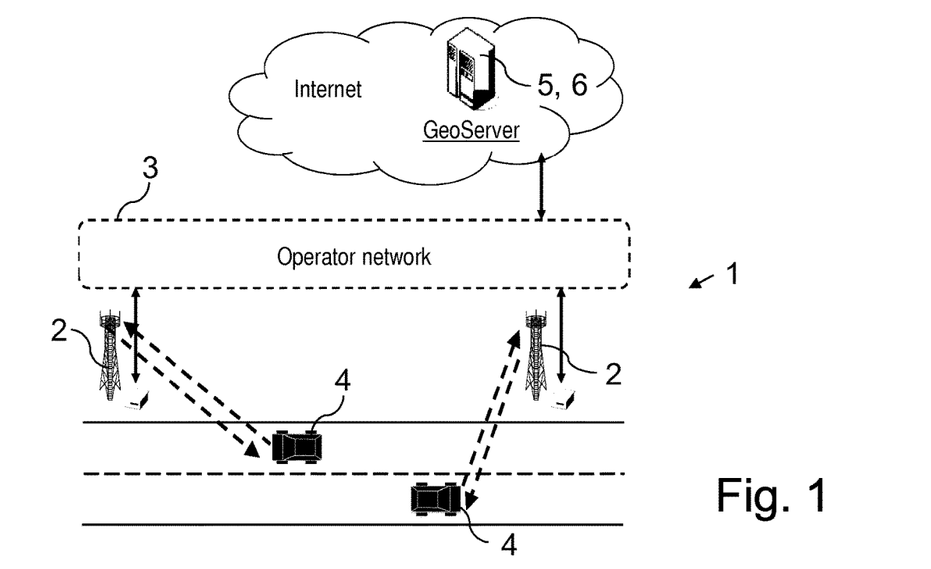
FIG. 1 is a schematic view illustrating an application scenario of vehicular communication in a cellular-based communication network.

FIG. 1 schematically illustrates a design approach for leveraging cellular networks to support vehicular communication. The cellular-based communication network 1 comprises a number of base stations 2 (one per cell), which are connected to the operator network 3. The base stations 2 communicate in the uplink and in the downlink with vehicles 4, as indicated by the dotted lines. A centralized control entity 5, which in FIG. 1 is denoted GeoServer 6, serves as a message reflector to facilitate the communication among vehicles 4. More specifically, GeoServer 6, which is responsible for a geographical area, functions as a server for its clients (which may be vehicles as well as road infrastructure) by processing incoming messages from its clients and redistributing these messages to them. The main functionality of GeoServer 6 is to provide vehicles 4 with geographical-related services such safety- and commercial-related services.

Figure 2:
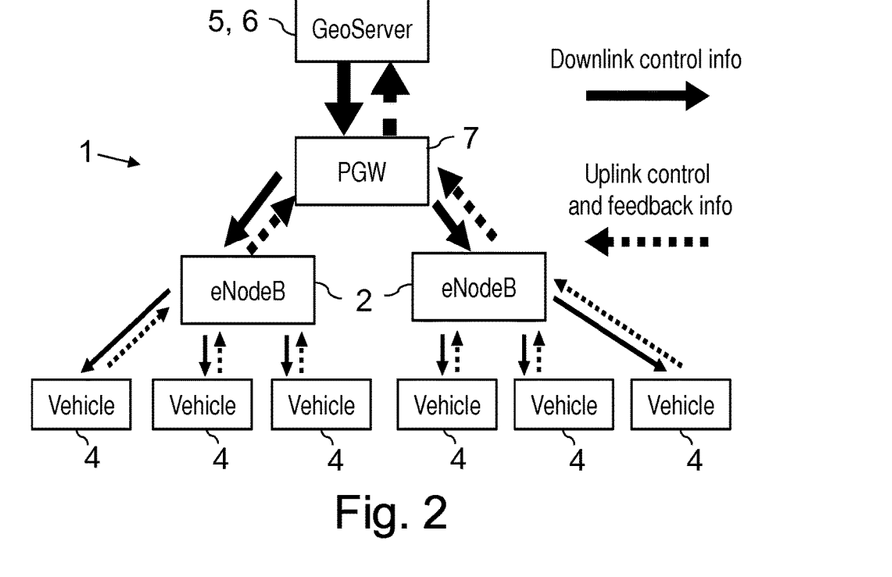
FIG. 2 is a schematic view illustrating a vehicular communication scenario in an LTE network according to an embodiment of the present invention.

In TD-LTE, radio resources are divided in time into consecutive frames. In turn, a frame is partitioned into uplink and downlink subframes, as described in document 3GPP, "TS 36.211 V10.4.0; Evolved Universal Terrestrial Radio Access (E-UTRA); Physical Channels and Modulation", December 2011. Downlink subframes are used for data transmission from a base station (eNodeB) 2 to the user equipment (UE), i.e. to the vehicles 4. Uplink subframes are used for data transmission from vehicles/UEs 4 to a base station 2. Thus, in TD-LTE, all data transmissions go to or come from a base station 2, as can be obtained from the general network scenario as illustrated in FIG. 2. Furthermore, most mobile cellular networks (including LTE, UMTS, etc) implement a hierarchical network topology. User data is transported from the base station 2 in the radio access network (RAN) into the core network (CN) to only a few gateways (packet data network gateway—PDN-GW 7—in LTE networks).

Embodiments of the present invention are related to an application-level rate control mechanism which works in cellular-based networks, like the exemplary LTE network 1 shown in FIG. 2. In such networks, all data are processed and forwarded by a centralized control entity 5. In FIG. 2 this central coordinator, which coordinates the data transmission of the vehicles 4, is again illustrated as GeoServer 6. To allow rate adaptation, in addition to the actual data, control and feedback information for rate adaptation is sent via the uplink (dotted line arrows) and the downlink (solid line arrows) channels.

In the illustrated embodiment, optimal rate calculation and adjustment is always performed by the control entity 5. More specifically, a centralized mechanism is implemented that adjusts the message transmission rate, for both uplink and downlink data transmission, which is aimed to minimize the depreciation of information. The information depreciation is regarded as a metric to measure the newness or freshness of the information that is stored at each vehicle 4. Accordingly, the goal of the packet transmission rate adjustment procedure is to optimize the freshness (or newness) of the data available at the vehicles 4 and/or the control entity 5.

According to an embodiment of the present invention, the information depreciation metric is defined as the maximum difference between the current time and the time when the information has been gathered at the vehicle 4 (or, correspondingly, the control entity 5) and sent out to the control entity 5 (or, correspondingly, the vehicle 4). Mathematically, this information metric is defined as follows:

Depreciation=PacketInterval*
ExpectedNumberOfConcecutivelyLostPackets+
PacketDelay The packet interval is the reciprocal value of the packet rate.

It is noted that the depreciation can be evaluated for the uplink and downlink independently. Moreover, the rates for the uplink and downlink data transmission can be different, due to their different bandwidth and data rate support. The rate adjustment procedures for the uplink and downlink are slightly different, as will be described in connection with FIGS. 3 and 4.

Figure 3:
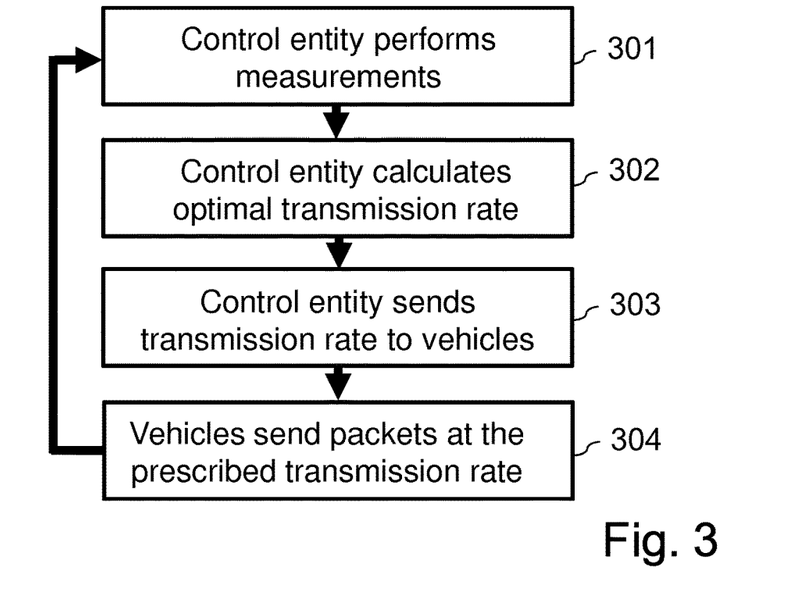
FIG. 3 is a flow diagram illustrating a rate adjustment procedure for the uplink in accordance with an embodiment of the present invention.
Figure 4:
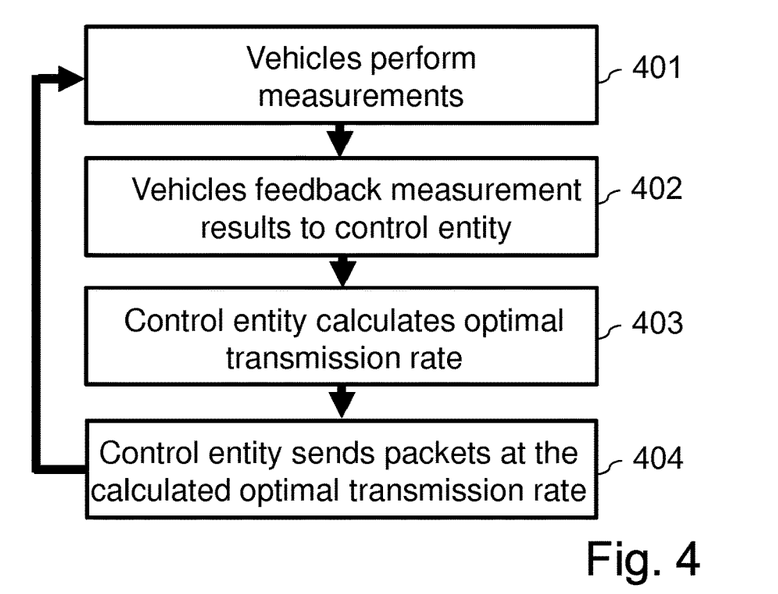
FIG. 4 is a flow diagram illustrating a rate adjustment procedure for the downlink in accordance with an embodiment of the present invention.

FIGS. 3 and 4 show the procedures that are executed continuously and recursively as long as the client (vehicle 4) is connected to the control entity 5 for the uplink and downlink, to optimize the defined performance metric. These procedures are carried out for each cell (which corresponds to one base-station in the cellular network) independently. FIG. 3 illustrates the rate adjustment procedure for the uplink. In step 301 the control entity 5 performs measurements related to packet transmission characteristics, like the delay of packets sent by vehicles 4. As will be appreciated by those skilled in the art, in vehicular networking vehicles 4 are typically equipped with Global Positioning System (GPS) devices which can provide accurate global timing. Hence, the delay of packets can be directly measured at the receiver. To this end all nodes, i.e. the vehicles 4 as well as the control entity 5 should keep synchronized with the global time.

Next, as shown in step 302, the control entity 5 calculates an optimal packet transmission rate, which will be described in more detail below. In step 303 the control entity 5 sends the calculated optimal packet transmission rate to the connected vehicles 4, which then, as indicated in step 304, start transmitting messages at the prescribed transmission rate. The rate adjustment procedure recursively continues with step 301.

The rate adjustment procedure for the downlink, which is illustrated in FIG. 4, is quite similar, this time however with the vehicles 4 performing the measurements (step 401) and transmitting respective feedback information related to the measurement results back to the control entity 5 (step 402). As will be described in more detail below, in step 403 the control entity 5 calculates the optimal packet transmission rate and, in step 404, it starts transmitting packets at the resulting optimal transmission rate.

In the embodiment of the present invention described above, the optimal rate calculation (step 302 in FIG. 3 and step 403 in FIG. 4, respectively) is based on the following parameters: packet delay, position and speed of each vehicle 4, the total number of vehicles 4 in a particular cell, as well as environmental and system-specific parameters. The above parameters (or at least a subset thereof) are regarded as input to the algorithm for rate adaptation, which determines the optimal transmission rate for the application messages.

Further, in the embodiment of the present invention described above, the optimal rate calculation is designed as a two stage process, which includes a coarse estimation as well as fine estimation. In the coarse estimation the transmission rate is directly set to an optimal value that is calculated theoretically, based on the information at the control entity 5. In the fine estimation on the other hand the transmission rate is iteratively adjusted in small steps based on the observed information depreciation, in particular based on the difference of information depreciation before and after the last rate adjustment. In other words, a theoretical formula is used for coarsely calculating the optimal rate, and iterative optimal point tracking is used for fine adjustment, which ensures fast convergence and accurate result. Compared to traditional control loop mechanisms the combination of coarse and fine estimation provides fast convergence to an adaptive rate near the optimal value (the coarse estimation provides an "educated guess" and the fine estimation searches for the optimal value). This feature is useful, e.g., in environments such as wireless networks where parameters can fluctuate. Both calculation approaches are described hereinafter in some more detail.

According to one embodiment of the present invention, in the coarse estimation, the optimal value for the packet transmission rate is calculated from a theoretical formula that is obtained from queuing models at the application level. In such a model, the mean and variance of the delay and packet interval of all vehicles 4 are considered, and the optimal packet interval can be calculated as:

$$T^* = E(S) + \frac{1}{2}\sqrt{2(\sigma_T^2 + \sigma_S^2)},$$

where $E(S)$ is the expected service time that is estimated by $$E(S) = \frac{T + D + \sqrt{D^2 - 2DT + T^2 + 2(\sigma_T^2 + \sigma_S^2)}}{2},$$

T denotes the average packet interval that is obtained from feedback data, and $\sigma_T^2$ denotes its variance; D denotes the average delay; $\sigma_S^2$ denotes the variance of the service time, which is estimated by $$\sigma_S^2 = \sigma_D^2 \min\left\{\frac{T}{D}, 1\right\},$$

where $\sigma_D^2$ is the variance of the delay.

To additionally consider context information (e.g. the position and speed of vehicles) as well as other environmental and system-specific parameters, more sophistical theoretical model can be built and solved.

For the fine estimation, an "adjust and observe" method is used. The key idea is to change the packet interval for some small value, and observe whether the information depreciation has increased or decreased to decide which packet interval to use. An example of the estimation process is shown in the following pseudocode:

```
While (FineEstimation)
{
  Tracking:
  PacketInterval_0 = PacketInterval
  PacketInterval_min = PacketInterval
  Depreciation_min = Depreciation
  For k = -M to M
  {  PacketInterval = PacketInterval_0 + k * ΔPacketInterval
     If Depreciation < Depreciation_min
     {   PacketInterval_min = PacketInterval
         Depreciation_min = Depreciation
     }
     While (Feedback Not Received) { }
  }
  Using Optimal Interval:
  PacketInterval = PacketInterval_min
  While (Not Timeout) { }
}
```

As can be seen, the fine estimation process includes two phases: tracking and sending using the calculated optimal packet interval. During the tracking phase, one or more packet sending intervals are enumerated that are close to the previously used packet interval. In the above pseudocode, k is a weighting factor in the range of −M to M, and ΔPacketInterval is the smallest value at which the packet interval varies. After changing the packet interval, the process waits until feedback (when sending with the new packet interval) has been received to judge the effect of the packet interval change with respect to the information depreciation. After the tracking phase, the packet interval is set to the specific value that results in the minimum information depreciation, and transmission is performed with this packet interval for a predefined time period. After this time period, tracking is performed again.

Figure 5:
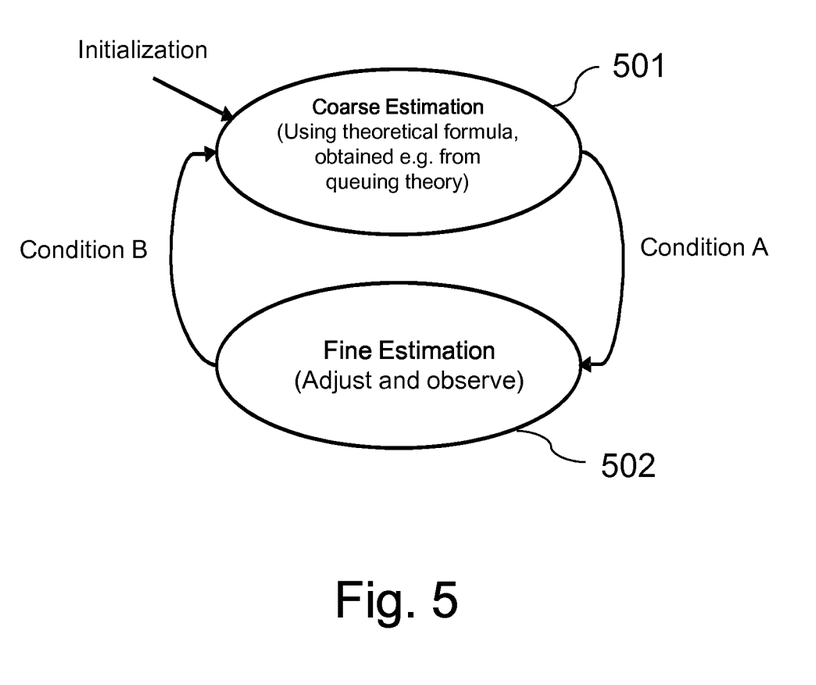
FIG. 5 is a schematic view illustrating the relationship between a coarse and a fine rate estimation in accordance with an embodiment of the present invention.

FIG. 5 schematically illustrates the relationship between the coarse estimation process 501 and the fine estimation process 502. According to the illustrated embodiment, the switching between coarse estimation 501 and fine estimation 502 is based on the variation of network congestion condition and context information, such as the speed of vehicles 4, etc. For instance, in case of condition termed A, i.e. in case congestion condition changes slowly (i.e. slower than a predefined threshold) and/or context information implies slow (i.e. below a predefined threshold) channel variation, a switch is performed from coarse estimation 501 to fine estimation 502. A switch back to fine estimation 502 is performed in case of a condition termed condition B, according to which congestion condition changes fast (i.e. faster than a predefined threshold) and/or context information implies fast (i.e. above a predefined threshold) channel variation. Generally, it is important to note that the combination of the coarse estimation 501 and fine estimation 502 is particularly useful for ensuring fast and accurate convergence or rate adaptation (by attempting to set to the optimal value directly) and considering deviations between the theoretical model and the actual network.

Figure 6:
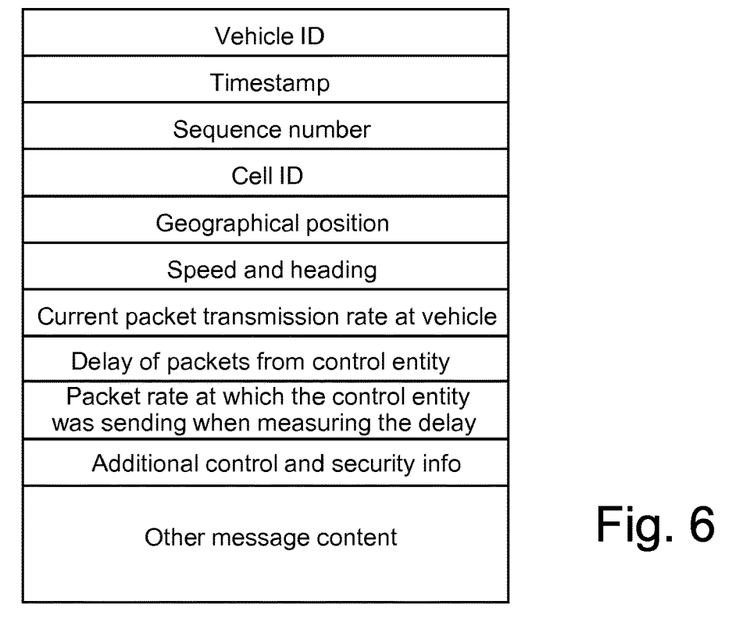
FIG. 6 is an exemplary illustration of uplink packet content.
Figure 7:
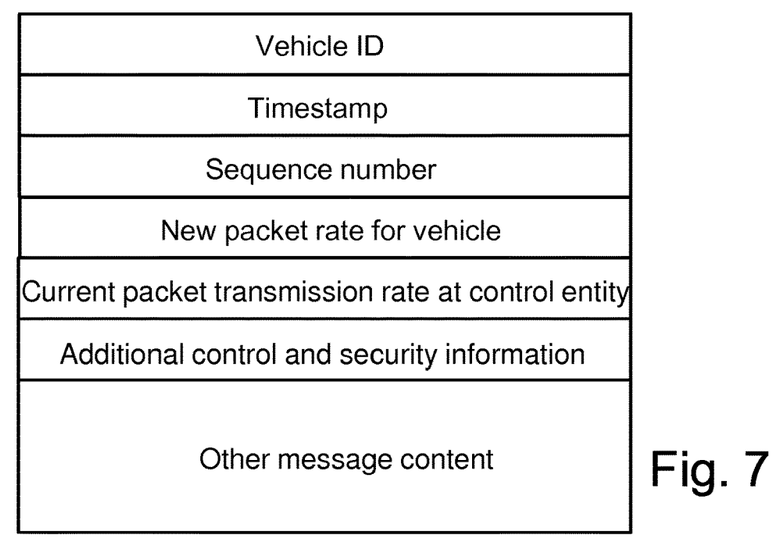
FIG. 7 is an exemplary illustration of downlink packet content.

Examples of uplink and downlink packet contents are shown in FIGS. 6 and 7, respectively. The vehicle ID specifies which vehicle the packet originates from (in uplink packets) or should be sent to (in downlink packets). The timestamp is for indicating the time at which the information has been updated and also for measuring the packet delay. The sequence number is for estimating the packet loss and discarding duplicate information that has been received more than once.

In the uplink packets, the cell ID specifies the cell (corresponding to a base-station in the cellular network) that the vehicle 4 currently belongs to. The geographical position, speed and heading are context information that can be used for rate adjustment. This information is also used by the GeoServer 6 to provide geographical-related services. The three data fields that follow include the current packet transmission rate at the vehicle 4, delay of packets from the control entity 5, and packet rate at which the control entity 5 was sending when measuring the delay. These fields contain feedback information to the control entity 5 for optimal rate calculation.

In the downlink packets, the new packet rate for vehicles 4 specifies the packet rate at which the vehicles 4 should send at. The current packet transmission rate at the control entity 5 allows the vehicles 5 to know which data rate the measured delay is corresponding to. As will be easily appreciated by those skilled in the art, additional control and security information, as well as other message content can be included as well.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting vehicular communication in a cellular-based communication system, the method comprising:

connecting a base station and a plurality of vehicles equipped with mobile communication devices;

coordinating, by a centralized control entity, transmission of uplink packets from the plurality of vehicles to the base station by recursively performing the following:

receiving, by the base station, the uplink packets from the plurality of vehicles, measuring one or more uplink packet transmission parameters of the uplink packets, determining, based on the measured uplink packet transmission parameters, a calculated interval between consecutive uplink packet transmissions, and broadcasting, to each of the plurality of vehicles, the calculated interval between consecutive uplink packet transmissions, wherein the calculated interval between consecutive uplink packet transmissions defines an uplink packet transmission rate, and wherein the plurality of vehicles transmit future uplink packets using the defined uplink packet transmission rate.

2. The method according to claim 1, further comprising:
coordinating, by the centralized control entity, transmission of downlink packets to the plurality of vehicles by recursively performing the following:

receiving, by the plurality of vehicles, the downlink packets, measuring, by the plurality of vehicles, one or more downlink packet transmission parameters of the downlink packets, and determining, based on the measured downlink packet transmission parameters, a calculated interval between consecutive downlink packet transmissions, wherein the calculated interval between consecutive downlink packet transmissions defines a downlink packet transmission rate, and wherein future downlink packets are transmitted at the downlink packet transmission rate.

3. The method according to claim 2, wherein the centralized control entity receives, from the plurality vehicles, feedback information regarding the one or more measured downlink packet transmission parameters of the downlink packets.

4. The method according to claim 3, wherein the feedback information regarding the one or more measured downlink packet transmission parameters of the downlink packets is transmitted by the plurality of vehicles to the centralized control entity via dedicated control channels of embedded in the control header of data packets.

5. The method according to claim 2, wherein the uplink packets and the downlink packets each include a timestamp indicating a time of generating or updating information contained in each respective packet.

6. The method according to claim 2, wherein information depreciation measuring freshness of information gathered at the vehicles is transmitted to the control entity, and wherein information depreciation measuring freshness of information gathered at the control entity is transmitted to the vehicles.

7. The method according to claim 1, further comprising connecting a second base station and a second plurality of vehicles equipped with mobile communication devices; and
coordinating, by the centralized control entity, transmission of uplink packets from the second plurality of vehicles to second the base station.

8. The method according to claim 1, wherein the measuring the one or more uplink packet transmission parameters of the uplink packets is performed by the centralized control entity and/or by the base station.

9. The method according to claim 1, wherein the measuring the one or more uplink packet transmission parameters includes measuring delay of the uplink packets sent by the plurality of vehicles.

10. The method according to claim 1, wherein the determining, based on the measured uplink packet transmission parameters, a calculated interval between consecutive uplink packet transmissions includes a coarse determination of the calculated interval between consecutive uplink packet transmissions theoretically according to a predefined algorithm.

11. The method according to claim 10, wherein the uplink packet transmission parameters include one or more of packet delay, vehicle position, vehicle speed, a total number of vehicles in a cell, and environmental and system-specific parameters, and
wherein the uplink packet transmission parameters serve as input to the predefined algorithm.

12. The method according to claim 10, wherein the predefined algorithm is based on queuing models at application level.

13. The method according to claim 10, wherein the determining, based on the measured uplink packet transmission parameters, a calculated interval between consecutive uplink packet transmissions further includes a fine determination of the calculated interval between consecutive unlink packet transmissions in which the calculated interval between consecutive uplink packet transmissions is adjusted in steps of a predefined size based on information depreciation measuring freshness of information gathered at the vehicles and/or at the control entity.

14. The method according to claim 13, wherein the calculated interval between consecutive uplink packet transmissions is adjusted so as to minimize the information depreciation.

15. The method according to claim 13, wherein the fine determination includes a tracking phase and a transmission phase.

16. The method according to claim 1, wherein the measuring one or more uplink packet transmission parameters of the uplink packets includes determining a mean and a variance for a delay of the uplink packets received from the plurality of vehicles, and
wherein the determining, based on the measured uplink packet transmission parameters, the calculated interval between consecutive uplink packet transmissions is based on the determined mean and variance for the delay.

17. A method for supporting vehicular communication in a cellular-based communication system, the method comprising:
connecting at least one base station and a plurality of vehicles equipped with mobile communication devices;
coordinating, by a centralized control entity, packet transmissions of the vehicles; and
adjusting a packet transmission rate by recursively performing:
measuring one or more parameters of packet transmission characteristics, and
determining, by the control entity, based on the measured one or more parameters of packet transmission characteristics, a determined packet transmission rate,
wherein the vehicles and/or the control entity transmit packets using the determined packet transmission rate, wherein adjusting the packet transmission rate includes a coarse determination of calculating the determined packet transmission rate theoretically according to a predefined algorithm wherein adjusting the packet transmission rate further includes a fine determination of adjusting the determined packet transmission rate iteratively in steps of a predefined size based on information depreciation measuring freshness of information gathered at the vehicle or at the control entity, and wherein a switching between the coarse determination and the fine determination is based on variation of network congestion or context information.

18. A cellular-based communication system with vehicular communication support, the system comprising:
a base station connected with a plurality of vehicles equipped with mobile communication devices; and
a centralized control entity configured to coordinate transmission of uplink packets from the plurality of vehicles to the base station by recursively performing:
measuring one or more uplink packet transmission parameters of the uplink packets received from the plurality of vehicles,
determining based on the measured unlink packet transmission parameters, a calculated interval between consecutive unlink packet transmissions, and
broadcasting, to each of the plurality of vehicles, the calculated interval between consecutive uplink packet transmissions,
wherein the calculated interval between consecutive uplink packet transmissions defines an uplink packet transmission rate, and
wherein the plurality of vehicles transmit future uplink packets using the defined uplink packet transmission rate.

19. The communication system according to claim 18, wherein at least one of the vehicles includes a location determination system.

20. The communication system according to claim 18, wherein the control entity is a GeoServer.

* * * * *